April 17, 1934.   F. A. LOZONNE   1,954,938
STEERING WHEEL ALIGNMENT INDICATOR
Filed Oct. 24, 1932
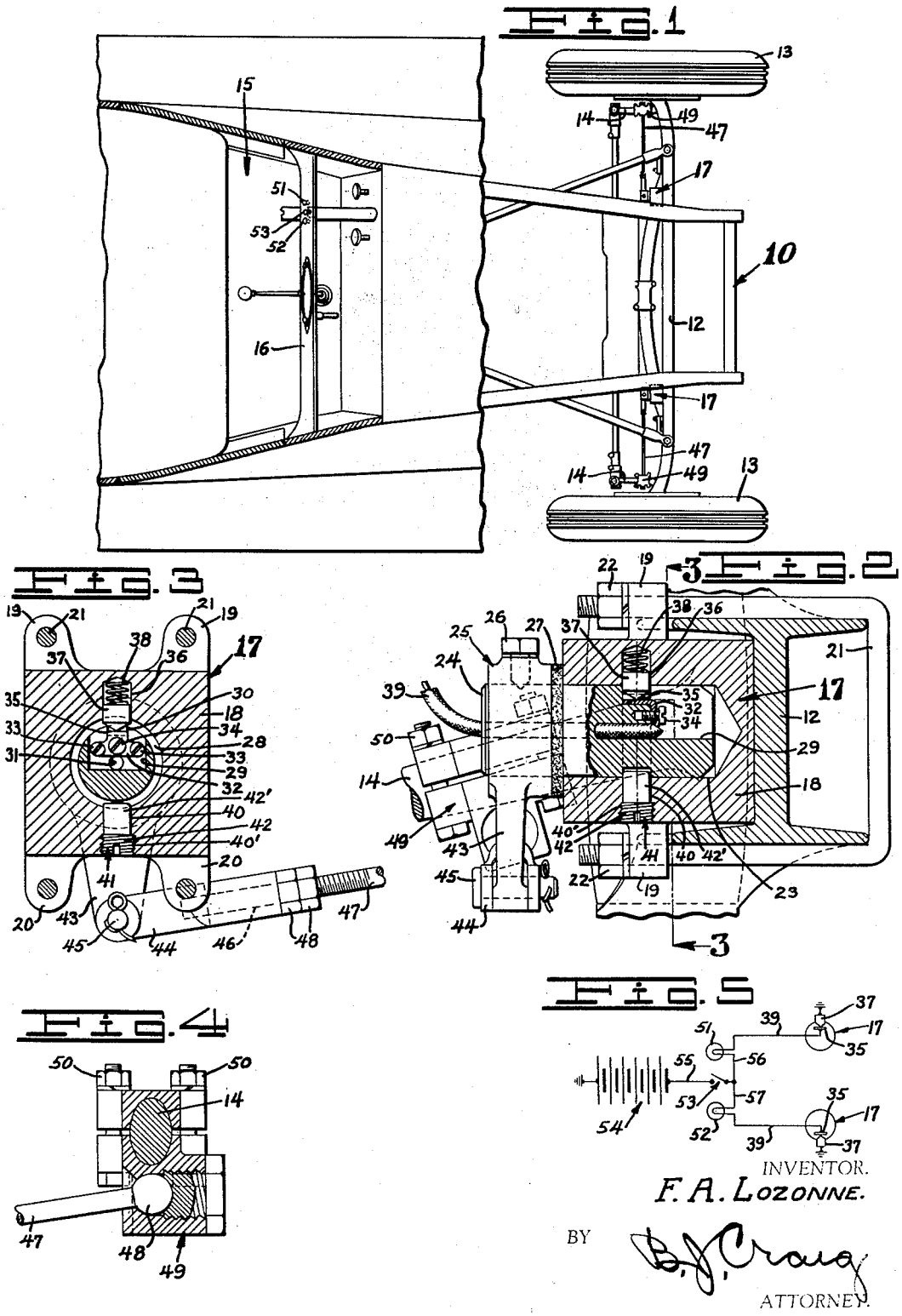
INVENTOR.
F. A. LOZONNE.
BY B. J. Craig
ATTORNEY.

Patented Apr. 17, 1934

1,954,938

UNITED STATES PATENT OFFICE 1,954,938

STEERING WHEEL ALIGNMENT INDICATOR

Frank A. Lozonne, Los Angeles, Calif.

Application October 24, 1932, Serial No. 639,242

4 Claims. (Cl. 177—311)

This invention relates to improvements in wheel alignment indicators.

The general object of the invention is to provide a device for use in combination with a vehicle including steerable wheels, which will indicate at a point remote from said steerable wheels whether or not the steerable wheels are in correct alignment.

Another object of the invention is to provide a wheel alignment indicating device which will actuate either when the vehicle is in motion or standing.

Other objects and the advantages of the invention will be apparent from the following description taken in connection with the accompanying drawing wherein:

Fig. 1 is a fragmentary plan sectional view of an automobile showing my device operatively installed thereon.

Fig. 2 is a section through the axle of a vehicle showing details of my device.

Fig. 3 is a section taken on line 3—3 of Fig. 2.

Fig. 4 is an enlarged cross section through one of the steering arm clamps and

Fig. 5 is an electrical wiring diagram of the device.

Referring to the drawing by reference characters, I have indicated an automobile embodying the features of my invention generally at 10. The automobile 10 may be of any type including a front axle 12 having steerable wheels 13 mounted thereon which are adapted to be turned by steering arms 14 which may be actuated in any desired manner. The automobile 10 further includes a driver's compartment 15 having the usual instrument board 16 therein. As shown my device includes a pair of operating members which are indicated generally at 17 both of which are similar in construction and therefore but one of them will be described in detail.

An operating member 17 includes a metal body portion 18 which is positioned between the flanges of the I-beam axle 12 on the inner side thereof. Integral with the body 18 I provide a pair of spaced upstanding apertured lugs 19 and a pair of similar downwardly extending lugs 20 by means of which the body 18 is secured to the axle 12 by U-bolts 21 and nuts 22.

The body 18 includes an annular recess 23 which opens through the rear face thereof and in which a stud shaft 24 is rotatably positioned. The stud shaft 24 is made of a suitable electrical insulation material such as a hard fiber composition. The shaft 24 extends beyond the rear face of the body 18 and has an actuating member 25 mounted thereon and secured thereto by a screw 26.

Surrounding the shaft 24 and positioned between the actuating member 25 and the adjacent face of the body I preferably provide a felt washer 27 to prevent dirt and dust from entering the body recess 23.

Intermediate the length of the shaft 24 within the recess 23 I provide an annular groove 28 in the shaft 24. As shown the groove 28 is preferable polygonal in cross section. From the groove 28 and extending rearwardly I provide a recess 29 in the shaft 24. Traversing the groove 28 and opening into the recess 29 I provide a recess 30 in the shaft 24 and coaxial with the shaft 24 I provide an elongated aperture 31 which opens through the rear end of the shaft and communicates with the shaft recess 29.

Positioned in the shaft recess 29, I provide a metal terminal member 32 which is shown as secured to the shaft by screws 33 and includes a terminal screw 34 and a contact finger 35 which is positioned in the recess 30 of the shaft.

In line with the annular groove 28 of the shaft the body 18 includes a recess 36 which opens into the recess 23. Positioned in the recess 36 I provide a metal plunger member 37, the inner end of which is preferably conical. Positioned in the recess 36 between the end thereof and the outer end of the plunger 37 I provide a coiled spring 38 which resiliently urges the plunger towards the shaft 24. The conical end of the plunger 37 is positioned in the annular recess 28 of the shaft 24.

Positioned in the shaft aperture 31 I provide an electrical conductive wire 39, one end of which is secured to the terminal member 32 by the terminal screw 34. Opposite the recess 36 I provide an aperture 40 in the body, a portion of which is threaded as at 40'. Positioned in the aperture 40, I provide a plug 41 which includes a threaded section 42 to match the threads 40' and a shank portion 42' which extends into the annular groove 28 of the shaft 24 to prevent longitudinal movement of the shaft. The plunger 37 also assists to prevent longitudinal movement of the shaft.

The actuating member 25 includes a downwardly extending arm 43 to which a suitable coupling member 44 is pivotally secured as indicated at 45. As shown the coupling member 44 includes a threaded aperture 46 in which the threaded end of a rod 47 is positioned. The rod 47 is retained in adjusted relationship with the coupling member by a pair of lock nuts 48. The opposite end of the rod 47 includes an enlarged ball head 48 which is connected to a suitable socket member 49 of any desired type which in turn is shown as secured to one of the steering arms 14 by clamping it thereto by bolts and nuts as indicated at 50.

When installing my wheel alignment indicating device an operating member 17 is secured to the axle 12 adjacent each of the wheels 13 and the actuating arms of the operating members are each connected by a coupling member 44, a rod 47 and a socket member 49 to the steering arm 14 with which it is associated. A pair of electric light bulbs 51 and 52 and an electrical control switch 53 are suitably mounted on the instrument board 16 of the automobile. As shown in Fig. 5, the wire 38 associated with the left hand operating member 17 is connected to the light bulb 51 and the wire 38 associated with the right hand operating member 17 is connected to the light bulb 52.

An automobile usually includes a storage battery which is indicated at 54 and one side of the battery is usually grounded to the frame of the vehicle, so, therefore, the plungers 37 of the operating members 17 may be considered grounded to the vehicle frame. The opposite side of the battery 54 is connected by a wire 55 to one side of the switch 53 and the other side of the switch is connected to the light bulbs 51 and 52 by wires 56 and 57 respectively.

When installing my wheel alignment indicating system on an automobile the wheels 13 must first be in perfect alignment. Then the rods 47 are secured to the steering arms 14 by means of the socket members 49 and the rods adjusted to retain the actuating arms 43 in a position wherein they retain the shafts 24 in position so that the plungers 37 of each of the devices 17 engage their respective terminal fingers 35. When each of the plungers 37 engage their associated fingers 35 and the switch 53 is closed an electric circuit is completed from the battery 54 through the wire 55 to the switch 53 and thence from the switch through wires 56 and 57 to the light bulbs 51 and 52.

From each of the light bulbs the current passes through the wire 38 to the terminal fingers 35 of the associated operating member 17 and thence through the plunger 37 to the ground and as one side of the battery is grounded an electrical circuit is completed from the battery through the light bulbs, through the device 17 and back to the battery thereby lighting the bulbs 51 and 52.

When the wheels 13 are not in true alignment the plungers 35 of one or both of the devices do not engage their associated terminal fingers 37 simultaneously so therefore when the switch 53 is closed only one of the light bulbs can be lighted at a time.

When the operator of an automobile having my improved system installed thereon desires to know whether or not the steering wheels of the automobile are in true alignment he closes the switch 53 and if when steering a straight course both the bulbs 51 and 52 light simultaneously he knows that the wheels are in correct alignment but if both of the bulbs do not light simultaneously he knows that the wheels are not in correct alignment.

From the foregoing description it will be apparent that I have provided a novel wheel alignment indicating system which is simple in construction and highly efficient in use.

Having thus described my invention, I claim:

1. In a vehicle including a pair of steerable wheels, means to steer said wheels, an operator's compartment, an operating member mounted on said vehicle adjacent each of said wheels, each of said operating members including a body portion secured to a portion of said vehicle, said body having a recess, a movable member mounted in each body recess, link means connecting each movable member with the steering means of the wheel with which it is associated, each body having an electrical contact thereon, said movable member having an electrical contact member thereon, each pair of contact members being in engagement when said wheels are turned to steer said vehicle in a straight line and said wheels are in true alignment, a pair of electrically operated members mounted in said driver's compartment, a source of electrical energy on said vehicle, electrical conductive means connecting one side of said electrical source with one of said contacts of said operating member, the other of said operating member contacts being electrically connected to one side of said electrically operated members, and electrical conductive means having a control switch interposed therein connecting the other side of said electrically operated members and the other side of said electrical source.

2. In combination with a vehicle including a pair of steerable wheels and means to steer said wheels, an operating member mounted on said vehicle adjacent each of said wheels, each of said operating members including a body portion having an annular recess therein, a shaft rotatably mounted in said recess, said shaft being made of an electrical insulation material, link means connecting said shaft with said steering means of the wheel with which it is associated, said shaft having a groove therearound intermediate its length, said body having a reduced recess in line with said shaft groove, said body having an aperture opposite said reduced recess, a plug positioned in said body aperture and including a portion extending into said shaft groove to prevent longitudinal movement of said shaft, said shaft having a recess traversing said groove and opening into said first body recess, a metal terminal member secured in the first shaft recess and including a contact finger positioned in said reduced shaft recess, a metal plunger in said reduced recess of said body, said plunger having an end positioned in said shaft groove, means to urge said plunger into engagement with said shaft, said plunger being grounded to the frame of said vehicle, a pair of electric light bulbs on said vehicle, a storage battery on said vehicle, one side of said battery being grounded to the frame of said vehicle, electrical conductive means connecting the other side of said battery and each of said light bulbs, a control switch interposed in said electrical conductive means and electrical conductive means connecting each of said bulbs with said terminal member of its associated operating member.

3. In combination with a vehicle including a pair of steerable wheels and means to steer said wheels, an operator's compartment, an operating member mounted on said vehicle adjacent each of said wheels, each of said operating members including a body portion having an annular recess therein, a shaft rotatably mounted in said recess, said shaft being made of an electrical insulation material, a crank arm secured to said shaft, means connecting said arm with said steering means of the wheel with which it is associated, said shaft having a groove therearound intermediate its length, said body having a reduced recess in line with said shaft groove, said body having an aperture opposite said reduced recess, a portion of said aperture being threaded, a plug positioned in said body aperture, said plug including a threaded portion engaging said threaded portion of said body aperture and a shank portion extending into said shaft groove to prevent longitudinal movement on said shaft, said shaft having a recess traversing said groove and opening into said first body recess, a metal terminal member secured in first shaft recess and including a contact finger positioned in said reduced shaft recess, a metal plunger in said reduced recess of said body, said plunger having a conical end positioned in said shaft groove, means to resiliently urge said plunger into engagement with said shaft, said plunger being grounded to the frame of said vehicle, a pair of electric light bulbs mounted in said driver's compartment, a storage battery on said vehicle, one side of said battery being grounded to the frame of said vehicle, electrical conductive means connecting the other side of said battery and each of said light bulbs, a control switch interposed in said electrical conductive means and electrical conductive means connecting each of said bulbs with said terminal member of its associated operating member.

4. In combination with a vehicle including a pair of steerable wheels and means to steer said wheels, an operating member mounted on said vehicle adjacent each of said wheels, each of said operating members including a body portion having a recess therein, a shaft mounted in said recess, link means connecting said shaft with said steering means of the wheel with which it is associated, said shaft having a groove therearound intermediate its length, said body having a recess in line with said shaft groove, said body having an aperture opposite said recess, means extending into said shaft groove to prevent longitudinal movement of said shaft, said shaft having a recess traversing said groove and opening into said first body recess, and including a contact finger positioned in said reduced shaft recess, a metal plunger in said reduced recess of said body, said plunger having an end positioned in said shaft groove, means to urge said plunger into engagement with said shaft, said plunger being grounded to the frame of said vehicle, electrical conductive means connecting the other side of said battery and each of said light bulbs, a control switch interposed in said electrical conductive means and electrical conductive means connecting each of said bulbs with said terminal member of its associated operating member.

FRANK A. LOZONNE.